United States Patent
Hepkin et al.

(10) Patent No.: US 8,412,691 B2
(45) Date of Patent: Apr. 2, 2013

(54) MAINTENANCE AND ACCESS OF A LINKED LIST

(75) Inventors: David A. Hepkin, Austin, TX (US); Stephen B. Peckham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 12/879,829

(22) Filed: Sep. 10, 2010

(65) Prior Publication Data

US 2012/0066192 A1    Mar. 15, 2012

(51) Int. Cl.
G06F 7/00 (2006.01)
G06F 17/30 (2006.01)

(52) U.S. Cl. .................. 707/704; 707/800

(58) Field of Classification Search ........... 707/704, 707/800, 803, 690, 802, 812
See application file for complete search history.

(56) References Cited

U.S. PATENT DOCUMENTS

| | | | |
|---|---|---|---|
| 6,343,339 B1 * | 1/2002 | Daynes | 710/200 |
| 7,117,502 B1 | 10/2006 | Harris | |
| 7,249,352 B2 | 7/2007 | Fleming et al. | |
| 7,254,597 B2 | 8/2007 | Moir et al. | |
| 7,293,143 B1 | 11/2007 | Shavit et al. | |
| 7,376,684 B2 | 5/2008 | Blandy | |
| 7,823,201 B1 * | 10/2010 | Xu | 726/22 |
| 2004/0040018 A1 | 2/2004 | Fleming et al. | |
| 2005/0278487 A1 | 12/2005 | Blandy | |
| 2006/0161737 A1 | 7/2006 | Martin | |
| 2006/0173939 A1 | 8/2006 | Yin et al. | |
| 2007/0130238 A1 | 6/2007 | Harris et al. | |
| 2007/0198519 A1 | 8/2007 | Dice et al. | |
| 2007/0198979 A1 | 8/2007 | Dice et al. | |
| 2008/0140738 A1 | 6/2008 | Blandy | |
| 2008/0215648 A1 | 9/2008 | Blandy | |
| 2009/0204654 A1 | 8/2009 | Delsart et al. | |
| 2009/0327372 A1 | 12/2009 | Ylonen | |
| 2010/0042584 A1 | 2/2010 | Shavit et al. | |
| 2010/0077172 A1 | 3/2010 | Pizlo | |
| 2010/0114998 A1 | 5/2010 | Steensgaard et al. | |

OTHER PUBLICATIONS

James H. Anderson et al., Real-time computing with lock-free shared objects, May 1997, vol. 15, ACM, 134-165.*
Chris Lattner et al., Transparent Pointer Compression for Linked Data Structures, 2005, ACM, 12 pages.*
Sven Groot et al., The Automatic Transformation of Linked List Data Structures, 2007, IEEE, 408.*

* cited by examiner

*Primary Examiner* — Jean B Fleurantin
(74) *Attorney, Agent, or Firm* — DeLizio Gilliam, PLLC

(57) ABSTRACT

A method includes atomically reading a next field of a current element of the linked list to determine a first value that encodes a first pointer to the first element and a first indication of an owner of the first element. The first indication of the owner is stored in a first of a plurality of multi-field reservation data structures. The operation includes determining whether the next field of the current element still indicates the first value. The operation includes reading the first element of the linked list via the first pointer if the next field of the current element still indicates the first value. If the next field of the current element indicates a current value different than the first value, the first indication of the owner is removed from the first multi-field reservation data structure, and storing and determining with the second value is repeated.

15 Claims, 6 Drawing Sheets

MAINTENANCE AND ACCESS OF A LINKED LIST

BACKGROUND

Performing maintenance of a linked list where multiple readers and writers may be attempting to access the linked list can be problematic. Examples of maintenance include adding or removing of elements from the linked list, garbage collection of removed elements in the linked list, etc. Multiple readers should be able to traverse the linked list concurrently and quickly. Readers can read stale elements in the list. However, an element in the list cannot be freed while any reader is potentially reading the element. A conventional method for solving this problem is to use a lock to serialize both readers and writers from and to the linked list. A read-write lock could also be used. However, these methods can affect performance because of the overhead of obtaining the lock.

SUMMARY

Embodiments include a method that includes a first of a plurality of readers of a linked list performing an operation to attempt to read a first element of the linked list. The operation includes atomically reading a next field of a current element of the linked list to determine a first value. The first value encodes a first pointer to the first element and a first indication of an owner of the first element. The operation includes decoding the first value to determine the first pointer and the owner. The operation includes storing the first indication of the owner in a first of a plurality of multi-field reservation data structures, wherein the first multi-field reservation data structure corresponds to the first reader. The operation includes determining whether the next field of the current element still indicates the first value. The operation includes reading the first element of the linked list via the first pointer if the next field of the current element still indicates the first value. If the next field of the current element indicates a current value different than the first value, the operation includes removing the first indication of the owner from the first multi-field reservation data structure, and repeating said decoding, storing and determining with the second value.

Embodiments include an apparatus comprising a machine-readable medium configured to store elements in a linked list. The apparatus includes a processor and a reader executable on the processor. The reader is configured to read the linked list, wherein the reader is configured to performing an operation to attempt to read a first element of the linked list. The operation is configured to atomically read a next field of a current element of the linked list to determine a first value, wherein the first value encodes a first pointer to the first element and a first indication of an owner of the first element. The operation is configured to decode the first value to determine the first pointer and the owner. The operation is configured to store the first indication of the owner in a first of a plurality of multi-field reservation data structures, wherein the first multi-field reservation data structure corresponds to the first reader. The operation is configured to determine whether the next field of the current element still indicates the first value. The operation is configured to read the first element of the linked list via the first pointer if the next field of the current element still indicates the first value. If the next field of the current element indicates a current value different than the first value, the operation is configured to remove the first indication of the owner from the first multi-field reservation data structure, and repeat said decoding, storing and determining with the second value.

Embodiments include a computer program product for processing a linked list. The computer program product comprises a computer readable storage medium having computer readable program code embodied therewith. The computer readable program code comprises reader code that is configured to perform an operation to attempt to read a first element of a linked list. The operation is configured to atomically read a next field of a current element of the linked list to determine a first value, wherein the first value encodes a first pointer to the first element and a first indication of an owner of the first element. The operation is configured to decode the first value to determine the first pointer and the owner. The operation is configured to store the first indication of the owner in a first of a plurality of multi-field reservation data structures, wherein the first multi-field reservation data structure corresponds to the first reader. The operation is configured to determine whether the next field of the current element still indicates the first value. The operation is configured to read the first element of the linked list via the first pointer if the next field of the current element still indicates the first value. If the next field of the current element indicates a current value different than the first value, the operation is configured to remove the first indication of the owner from the first multi-field reservation data structure, and repeat said decoding, storing and determining with the second value.

Embodiments include a method comprising receiving a command to initiate garbage collection for freeing of an element removed from elements in a linked list stored in a machine-readable medium. Responsive to determining that a write-lock is not on the linked list, the method includes obtaining the write-lock on the linked list for the garbage collection. The method includes locating the element in the linked list. The method includes determining whether an identification of the element is stored in any fields of a plurality of multi-field data structures for a plurality of readers of the linked list. Each of the any fields of the plurality of multi-field data structures is reserved for storage of data that identifies read accesses of the elements in the linked list for the plurality of readers. Responsive to determining that the identification of the element is not stored in any of the fields of the plurality of multi-field data structures for the plurality of readers of the linked list, the method includes performing garbage collection of the element removed from the linked list.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
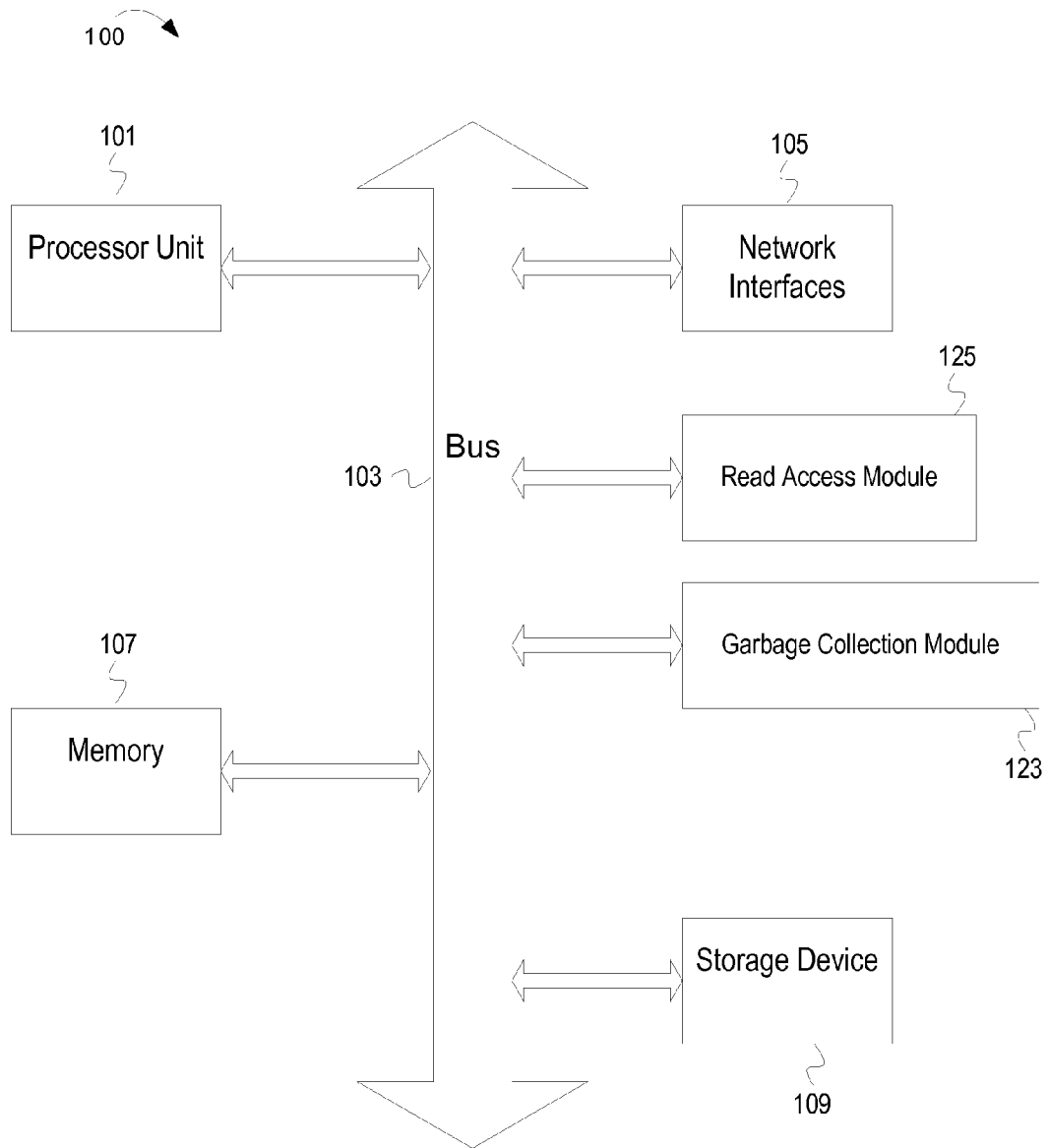
FIG. 1 is a block diagram illustrating a computer system, according to some example embodiments.

The description that follows includes exemplary systems, methods, techniques, instruction sequences, and computer program products that embody techniques of the present inventive subject matter. However, it is understood that the described embodiments may be practiced without these specific details. In other instances, well-known instruction instances, protocols, structures, and techniques have not been shown in detail in order not to obfuscate the description.

Some example embodiments provide operations for accessing of a linked list by multiple readers and multiple writers. Some example embodiments do not require readers of the linked list to obtain a lock prior to access. The writers to the linked list can be required to obtain a lock. Accordingly, some example embodiments allow for a single writer and multiple readers that access the linked list at a same time.

Rather than a lock to read elements of the linked list, some example embodiments use a multi-field data structure for each reader of the linked list. Each field in this data structure is dedicated for storage of data to identify read-access of the elements in the linked list. To identify read-access, the identification of the elements being read-accessed is stored in the fields of the multi-field data structure. The identification can be an identification of the owner of the element, the address of the element, etc. The owner of the element can be the process or application that created the element. As further described below, using the identification of the owner as the identification of the element enables garbage collection for all deleted elements for a given owner using a single scan of the multi-field data structures of the readers. This multi-field data structure can comprise two or more fields. Accordingly, a reader can be reading two different elements of the linked list at a same time. In some example embodiments, this multi-field data structure is stored external to the storage of the elements in the linked list. In some example embodiments, this multi-field data structure is within a memory space for the given reader. Writers to the linked list can access the multi-field data structure of each reader to determine whether any readers are accessing an element to be freed from the linked list during garbage collection.

This is in contrast to a conventional technique for accessing a linked list that uses a lock to serialize both readers and writers of the linked list. Another conventional technique uses a read lock and a write lock. However, these techniques are not suitable because of the overhead of obtaining the lock, monitoring ownership of the lock, etc. Another conventional technique using atomic operations (e.g., compare-and-swap). These atomic operations preclude other readers and writers from accessing an intermediate state of an element being updated in the linked list. However, this conventional technique requires broadcasting of an update of elements in the linked list. This broadcasting can affect performance, especially as more processors are introduced into the computing environment.

FIG. 1 is a block diagram illustrating a computer system, according to some example embodiments. A computer system 100 includes a processor unit 101 (possibly including multiple processors, multiple cores, multiple nodes, and/or implementing multi-threading, etc.). The computer system 100 includes memory 107. The memory 107 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 100 also includes a bus 103 (e.g., PCI, ISA, PCI-Express, HyperTransport®, InfiniBand®, NuBus, etc.), a network interface 105 (e.g., an ATM interface, an Ethernet interface, a Frame Relay interface, SONET interface, wireless interface, etc.), and a storage device(s) 109 (e.g., optical storage, magnetic storage, etc.).

The computer system 100 also includes a garbage collection module 123, and a read access module 125. The read access module 125 performs operations to access elements of a linked list without requiring a read lock. The garbage collection module 123 removes elements from a linked list and deletes the removed elements. The operations of the read access module 125 and the garbage collection module 123 are further described below. Any one of these functionalities may be partially (or entirely) implemented in hardware and/or on the processing unit 101. For example, the functionality may be implemented with an application specific integrated circuit, in logic implemented in the processing unit 101, in a co-processor on a peripheral device or card, etc. Further, realizations may include fewer or additional components not illustrated in FIG. 1 (e.g., video cards, audio cards, additional network interfaces, peripheral devices, etc.). The processor unit 101, the storage device(s) 109, and the network interface 105 are coupled to the bus 103. Although illustrated as being coupled to the bus 103, the memory 107 may be coupled to the processor unit 101.

Figure 2:
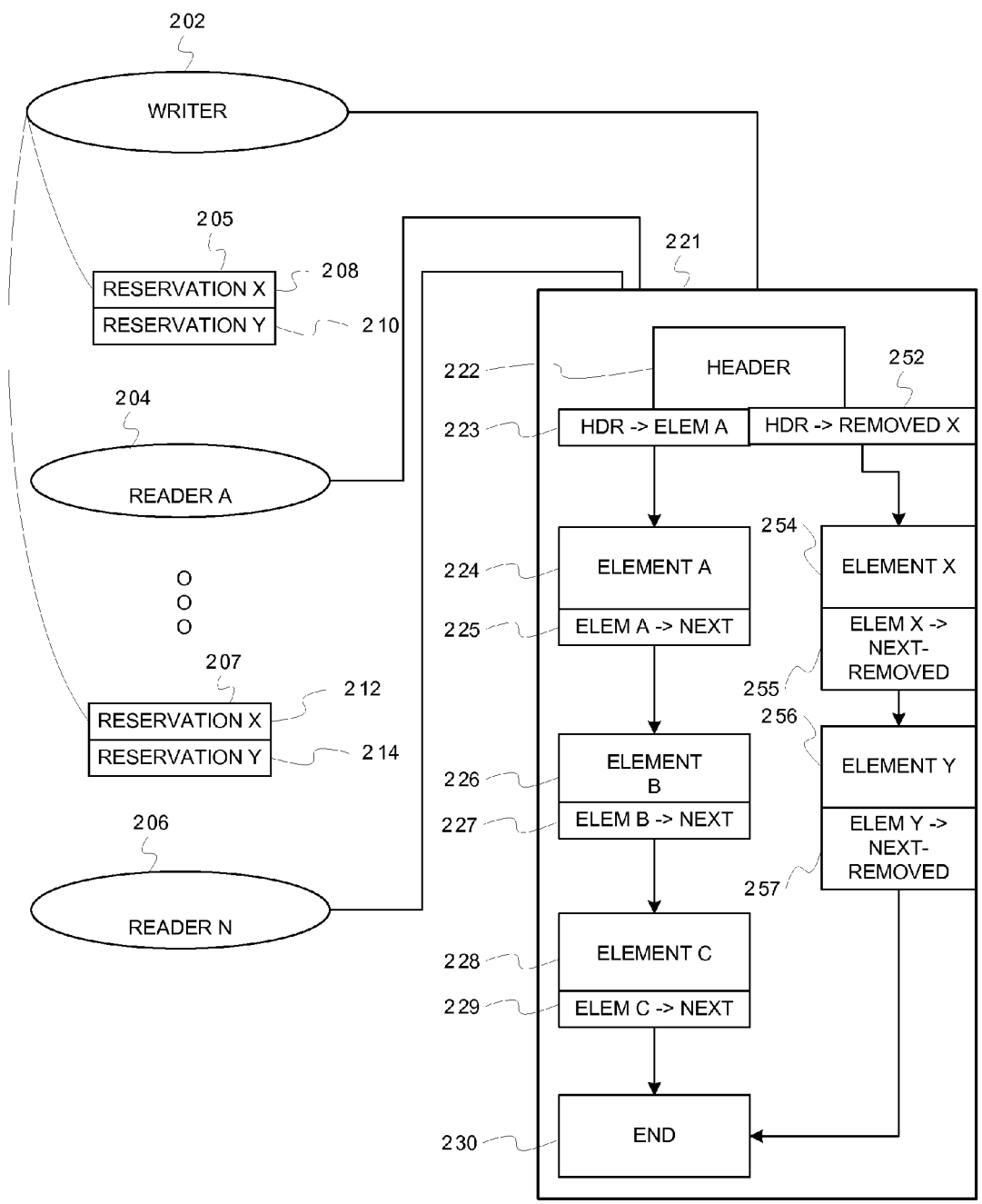
FIG. 2 is a block diagram illustrating relationships among a writer and multiple readers of a linked list, according to some example embodiments.

FIG. 2 is a block diagram showing relationships among a writer and multiple readers of a linked list, according to some example embodiments. FIG. 2 includes a writer 202, a reader A 204, a reader N 206 and a linked list 221. The linked list 221 includes a header 222 that is the beginning of the linked list 221. The linked list 221 includes two different linked lists. Both lists begin at the header 222. A first list starts with a next pointer 223, includes a number of elements and ends at an end 230. A second list starts with a next pointer 252, includes a number of elements and ends at the end 230. The first list includes those elements that have not been removed from the linked list 221. The second list includes those elements that have been removed from the linked list but have not yet been freed. The header 222 includes the next pointer 223 that points to the first element in the linked list 221—an element A 224. The next pointer 223 includes the address of the element A 224. The element A 224 can store data therein for subsequent read access. The element A 224 also includes a next pointer 225 that points to the next element in the linked list 221—an element B 226. The next pointer 225 includes the address of the element B 226.

The element B 226 can store data therein for subsequent read access. The element B 226 also includes a next pointer 207 that points to the next element in the linked list 221—an element C 228. The next pointer 207 includes the address of the element C 228. The element C 228 can store data therein for subsequent read access. The element C 228 also includes a next pointer 229 that points to the next element in the linked list 221—an end 230. The end 230 is the end of the linked list. The second list also starts at the header 222 that includes the next pointer 252 that points to the first removed element in the linked list 221—an element X 254. The next pointer 252 includes the address of the element X 254. The element X 254 also includes a next pointer 255 that points to the next removed element in the linked list 221—an element Y 256. The next pointer 255 includes the address of the element Y 256. The element Y 256 includes a next pointer 257 that points to the next element in the linked list 221—the end 230. As further described below, the second list is created during a garbage collection operation of the linked list. In this garbage collection operation (see the flowchart 500 of FIG. 5 described below), elements in the first list that are marked for removal from the linked list 221 are moved to the second list. In a different garbage collection operation (see the flowchart 600 of FIG. 6 described below), the elements are freed and therefore removed from the linked list 221. Elements are maintained in the second list until no readers are or will be accessing these elements. In some other example embodiments, the linked list 221 can be a circular linked list, wherein there is no end. Rather, the last next pointer in the linked list points back to the head of the linked list. In this example, the next pointer 229 would point to the header 222.

In some example embodiments, any or all of the next pointers (223, 225, 227, 229, 252, 255 and 257) are tagged pointers. A tagged pointer can be a value that encodes multiple values. For example, the encoded value can include a pointer to the next element in the linked list and an indication of an owner of the next element. Accordingly, the tagged pointer can be decoded by readers and writers of the linked list to locate the next element in the linked list and the owner of the next element. An owner of the element can be considered the application or process that created the element. In some situations, one owner can own multiple elements in the linked list. As further described below, the tagged pointer can be updated with a single store that completes atomically. Also, the tagged pointer can be read from in a single access that completes atomically. Accordingly, the encoding of the owner of the element in the tagged pointer enables a reader and a writer to determine an owner of the element without accessing the element.

Any type of data can be stored in the linked list 221. The data can be representative of components internal and external to a computer. In one example application, the kernel within an operating system of a computer can have a number of kernel services that are accessible by applications executing therein. For some kernel services, additional operations are performed prior to execution. For example, if the kernel service related to opening a file in a file system, the additional operations can include an external level of security checks, authentication, etc. In some example embodiments, the kernel services can be called as part of a system call in the operating system and handled by the system call handler. The system call handler can then access the appropriate kernel services depending on the type of system call.

Accordingly in this example, the elements of the linked list can be these additional operations for a kernel service. In this example, the readers would be the applications requesting execution of the kernel service. The writers would be an internal kernel administrative process that is authorized to perform updates to these operations. Therefore, loading of a kernel extension can cause allocation of memory for the associated reader. Different sections of the allocated memory can reference or contain different code to be executed by the kernel extension in order to perform the service provided by the kernel extension. However, every element of the linked list does not necessarily point to code units of a single kernel extension. In particular, a service called by an application can involve operations of different kernel extensions. After allocation, the sections of the memory are initialized (including identification of the owner). If multiple sections of memory are allocated for an owner, such sections are not necessarily placed into a same linked list. The owner can be identified in a header or metadata for the object or data structure that occupies the section of memory. After the linked list is constructed, the writer can get the address and owner identification of the section of memory and create a tagged pointer in the next field of a current element of the linked list.

Embodiments are not limited to linked list for kernel services. Other examples of linked list can relate to other applications both internal and external to the computer. For example, the elements can be names of persons in an organization, related items being displayed as part of an online auction, online sales, etc.

In a typical read traversal of the linked list 221, a reader begins at the header 222. The reader reads the address of the next element stored in the next pointer 223—the element A 224. The reader reads the data in the element A 224. The reader then reads the address of the next element stored in the next pointer 225—the element B 226. The reader reads the data in the element B 226. The reader then reads the address of the next element stored in the next pointer 207—the element C 228. The reader reads the data in the element C 228. The reader then reads the address of the next element stored in the next pointer 229—the end 230.

A writer can add or remove elements within the linked list 221. The writer reassigns the necessary next pointers in the linked list 221. One example is to add a new element (ELEM) to the header of the linked list. The next pointer for ELEM is assigned the value of the next pointer for the header 222. In other words, the next pointer for ELEM is equal to the address of the element A 224. The next pointer 223 for the header 222 is then assigned a value equal to the address of ELEM. After the first assignment, ELEM is still not visible to the readers, but the list starting with ELEM is consistent. After the second assignment, new readers can see ELEM at the head of the linked list 221. Similar write operations can occur for adding a new element to the middle or the end of the linked list 221.

Writers can remove elements from the linked list 221 using similar operations. One such application is a garbage collector application that removes elements from the linked list and subsequently frees such elements. One example is to remove an element from the head of the linked list 221. In this example, the element A 224 is removed. The next pointer 223 is assigned a value equal to the value of the next pointer 225. Accordingly, the next pointer for the header 222 is now pointing to the element B 226 (bypassing the element A 224). Similar operations are performed for removing an element from the middle or end of the linked list 221.

Without additional operations, the element A 224 cannot be deleted because a reader could still be processing the element. Some example embodiments described in more detail below provide for such operations. Also, these additional operations do not require a read lock. Rather, in some example embodiments, each reader has an associated multi-field data structure. Each field in this data structure is dedicated for storage of data to identify read access of the elements in the linked list. This multi-field data structure can comprise two or more fields. This multi-field data structure is stored external to the storage of the elements in the linked list. In some example embodiments, this multi-field data structure is within a global, persistent data structure. As further described below, writers to the linked list access the multi-field data structure of each reader to determine whether any readers are accessing an element to be removed from the linked list during garbage collection.

To further describe, FIG. 2 illustrates one writer and multiple readers that access the linked list 221. While shown with one writer and two readers, some example embodiments can have one to N number of writers and one to N number of readers. Each reader includes an associated multi-field data structure. A multi-field data structure 205 is associated with the reader A 204. A multi-field data structure 207 is associated with the reader N 205. In some example embodiments, the multi-field data structures are readable even if the associated readers are not active (e.g., actively traversing the linked list). The multi-field data structures can be representative of any type of data structure for storage of data. In some example embodiments, the multi-field data structures are data arrays. In some example embodiments, the multi-field data structure comprises two fields. Each field in the multi-field data structures can store an identification of an element in the linked list 221 that the associated reader is currently accessing. For example, the identification of the element can be the address of the element, an identification of the owner of that element, etc.

The multi-field data structure 205 includes a reservation field X 208 and a reservation field Y 210. The multi-field data structure 207 includes a reservation field X 212 and a reservation field Y 214. As an example of an operation, assume that reader A 204 is performing a read access of the element A 224 and a read access of the element B 226. The reservation field X 212 would store an identification of the element A 224. The reservation field Y 214 would store an identification of the element B 226. Also as shown, the writer 202 has read access to each of the multi-field data structures. As further described below, writers (e.g., a garbage collection module) access these fields in the multi-field data structures to determine whether a given element in the linked list 221 is being accessed by any readers. If an identification of the given element is not within the fields of any of the multi-field data structures, the given element can be freed as part of garbage collection.

Figure 3:
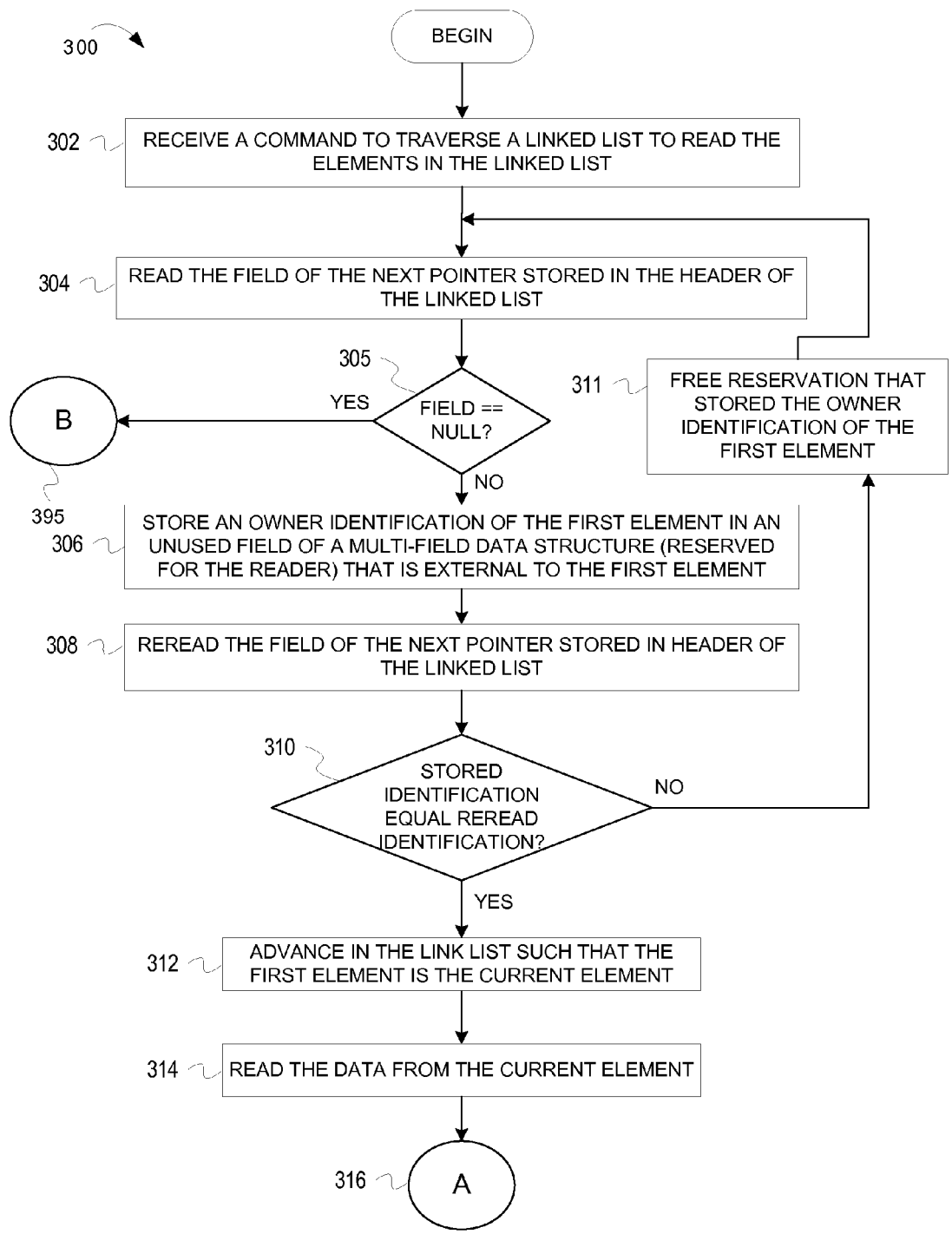
FIGS. 3-4 are flowcharts of operations for read accessing of a linked list, according to some example embodiments.
Figure 4:
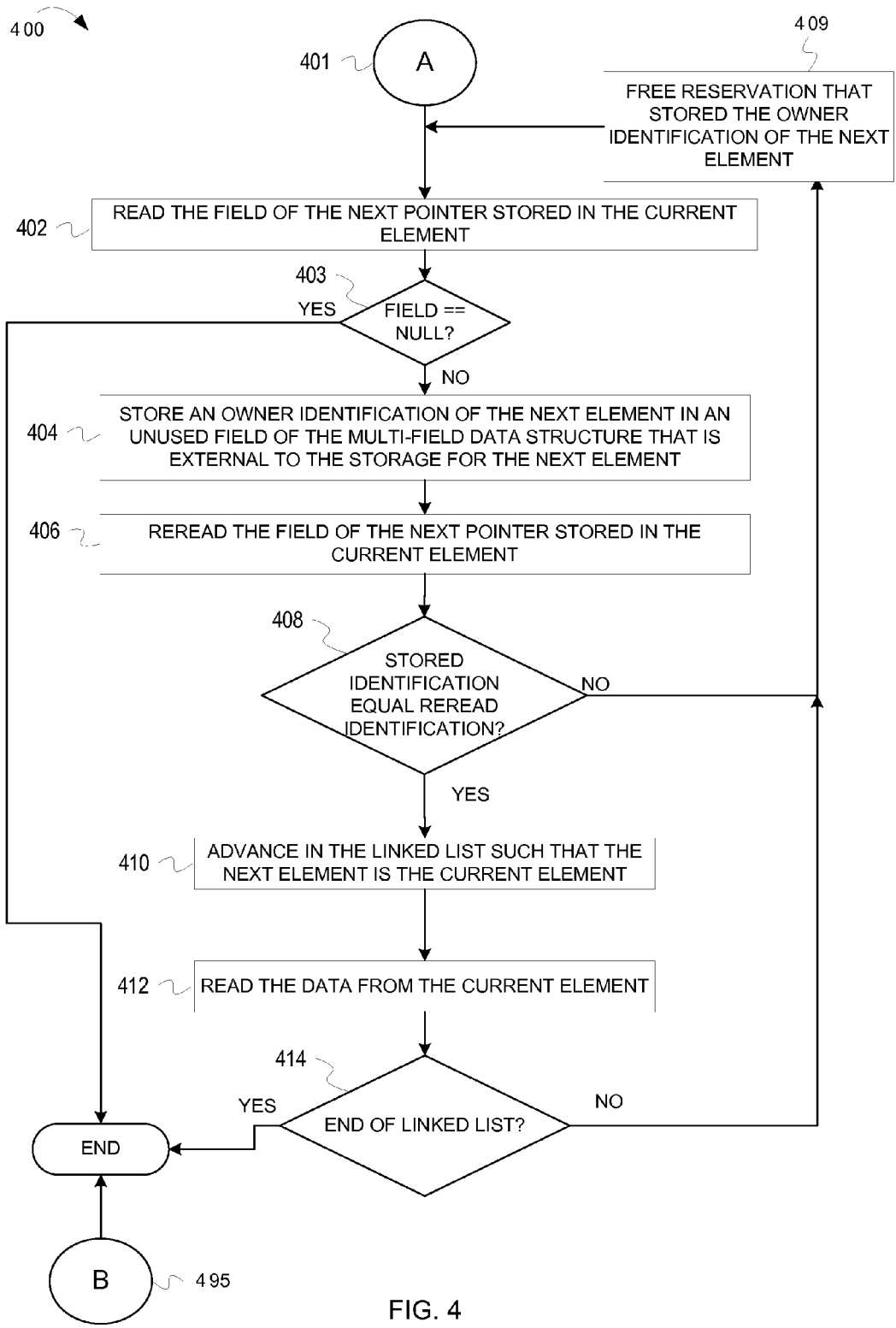
Figure 6:
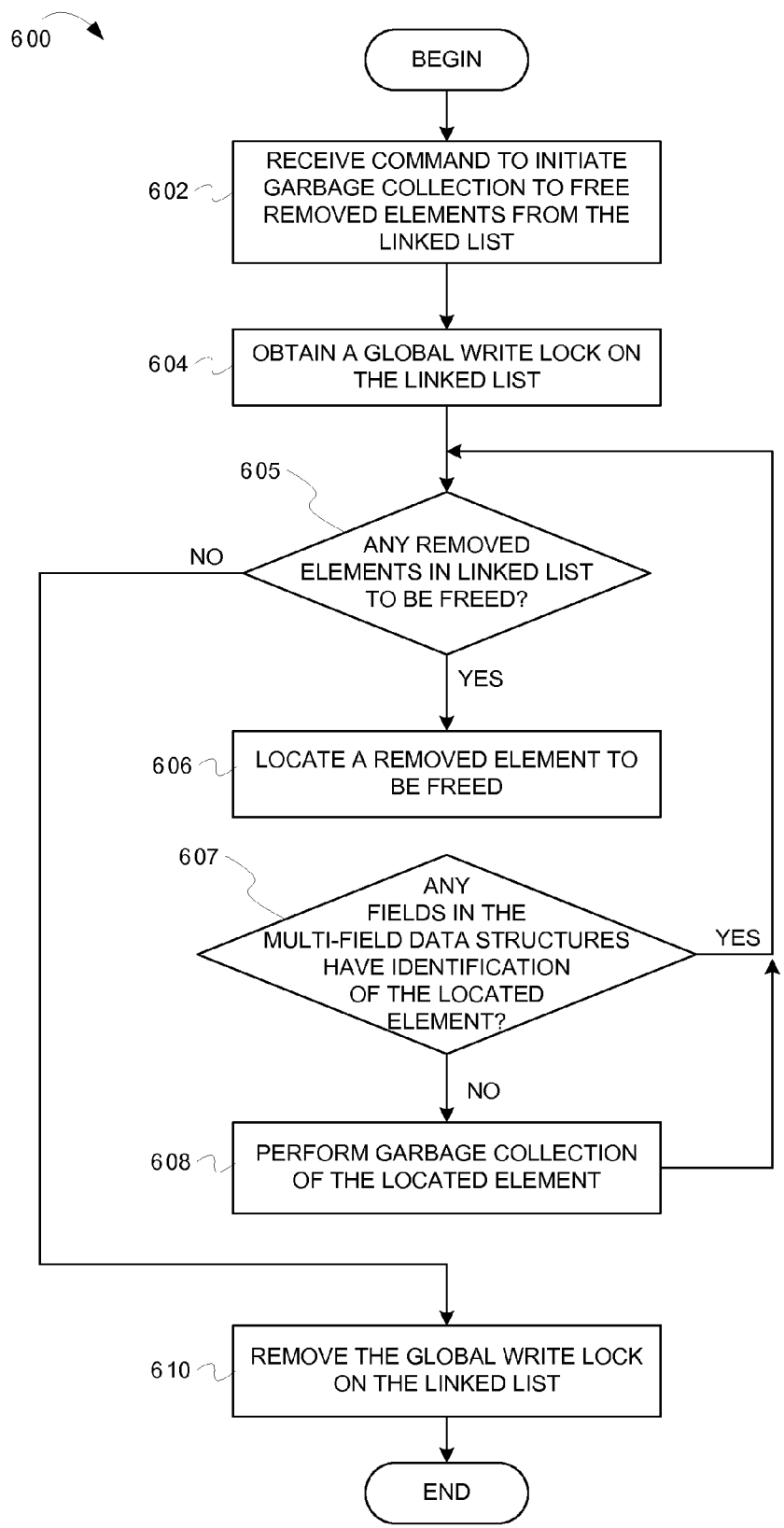

Operations for read and write access of a linked list are now described. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flowchart. Three different flowcharts are now described. FIGS. 3 and 4 illustrate operations for read accessing of a linked list. FIG. 6 illustrates operations for garbage collection of deleted elements in a linked list.

In particular, FIGS. 3-4 are flowcharts of operations for read accessing of a linked list, according to some example embodiments. FIGS. 3-4 are described as being performed by the read access module 125 of FIG. 1. The read access module 125 can be representative of any type of reader that is performing a read access of a linked list. A flowchart 300 is described with reference to FIGS. 1-2.

The read access module 125 receives a command to traverse a linked list to read the elements of the linked list (302). This command can be from any application or process that requests that the read access module 125 traverse the elements of the linked list. As described above, these elements can be additional operations performed prior to execution of a kernel service in an operating system. Accordingly, this command can be received from the kernel to perform the additional operations listed in the linked list prior to executing of the kernel service. The command can provide the address of the header of the linked list. With reference to FIG. 2, the address of the header 222 of the linked list 221 can be provided along with the command. Operations of the flowchart 300 continue.

The read access module 125 reads the field of the next pointer stored in the header of the linked list (304). With reference to FIG. 2, the read access module 125 reads the field of the next pointer 223. As described above, the next pointer can comprise a tagged pointer. Accordingly, the next field stores a value that encoded with multiple values. For example, the encoded value can include the address of the first element in the linked list and an indication of the owner of the first element. With reference to FIG. 2, the next pointer 223 would store the address and the owner indication for the element A 224. Therefore, as part of the read, the read access module 125 can decode the field of the next pointer to obtain the address and owner identification of the first element. Operations of the flowchart 300 continue.

The read access module 125 determines whether the field is equal to NULL (305). In other words, the read access module 125 determines whether the linked list is empty. If the field is equal to NULL, operations of the flowchart 300 and the flowchart 400 are complete (continue at point 395, which goes to point 495 of the flowchart 400, which completes the operations). If the field is not equal to NULL, operations of the flowchart 300 continue.

The read access module 125 stores the owner identification of the first element in an unused field of a multi-field data structure (reserved for the reader) that is external to the first element (306). With reference to FIG. 2, assume the read access module 125 is represented by the reader A 204. The multi-field data structure 208 is reserved for the reader A 204. In some example embodiments, at least one field in the multi-field data structure is usable as a reader traverses the linked list. Also, at least two fields can be required because in some example embodiments, operations require a reader to record the use of two consecutive elements at a time: the current element (from which the next pointer is being read) and the subsequent element (whose address is being read). Accordingly, an owner identification of the current element can be stored in a first field of the multi-field data structure, and an owner identification of the subsequent element can be stored in a second field of the multi-field data structure. Returning to the example of FIG. 2, the reader A 204 stores the owner identification of the first element in the reservation field X 208. In some example embodiments, a reader is the only module that has write access to its associated multi-field data structure. Accordingly, other readers or writers cannot write to this associated multi-field data structure. Also, as further described below, writers can read the multi-field data structure for each reader to determine whether updates can be performed to the linked list. In some example embodiments, this owner identification of the element for subsequent accessing by the writer is stored external to the linked list. Operations of the flowchart 300 continue.

The read access module 125 rereads the field of the next pointer stored in the header of the linked list (308). With reference to FIG. 2, the read access module 125 again reads the field from the next pointer 223, after storage of the identification of the first element in the multi-field data structure (see 306). This rereading of the field ensures that the address of the next pointer has not changed to an address of a different element while the identification of the first element is being stored. Operations of the flowchart 300 continue.

The read access module 125 determines whether the owner identification of the first element stored in the multi-field data structure is equal to the owner identification of the element whose address was reread after storage (310). With reference to FIG. 2 and returning to the example where the read access module 125 is the reader A 204, the reader A 204 determines whether the owner identification stored in the reservation field X 208 is equal to the owner identification of the element A 224 stored in the next pointer 223. If the identifications are not equal, operations continue at 311. In such a situation, the linked list has changed since the identification of the first element has been stored in the multi-field data structure. In particular, the next pointer of the header of the linked list is now pointing to a different element. For example, a writer may have added an element between the header 222 and the element A 224. Alternatively or in addition, a writer may have deleted the first element (the element A 224). If the owner identifications are equal, operations of the flow chart 300 continue at 312.

The read access module 125 frees the reservation in the field in the multi-field data structure that stored the owner identification of the first element (311). In particular, the read access module 125 frees the reservation made at 306 because the stored identification did not equal the reread identification. Operations of the flowchart 300 return to 304.

The read access module 125 advances in the linked list such that the next element is the current element (312). With reference to FIG. 2, the read access module 125 advances in the linked list 221 such that the current element being processed is the element A 224. Operations of the flowchart 300 continue.

The read access module 125 reads the data from the current element (314). With reference to FIG. 2, the read access module 125 reads the contents stored in the element A 224. Operations of the flow chart 300 continue at 314 which reference point A. Point A is referenced in FIG. 4 where the operations of read accessing of the linked list continue (see 401 of FIG. 4). From point A, operations of the flowchart 400 continue.

The read access module 125 reads the field of the next pointer stored in the current element of the linked list (402). With reference to FIG. 2, the read access module 125 reads the field from the next pointer 225. As described above, the next pointer can comprise a tagged pointer. Accordingly, the next field stores a value that encoded with multiple values. For example, the encoded value can include the address of the next element in the linked list and an indication of the owner of the next element. With reference to FIG. 2, the next pointer 225 would store the address and the owner indication for the element B 226. Therefore, as part of the read, the read access module 125 can decode the field of the next pointer to obtain the address and owner identification of the next element. Operations of the flowchart 400 continue.

The read access module 125 determines whether the field is equal to NULL (403). In other words, the read access module 125 determines whether there are no remaining elements in the linked list. If the field is equal to NULL, operations of the flowchart 400 are complete. If the field is not equal to NULL, operations of the flowchart 400 continue.

The read access module 125 stores an owner identification of the next element in an unused field of a multi-field data structure (reserved for the reader) that is external to the next element (404). With reference to FIG. 2, assume the read access module 125 is represented by the reader A 204. The multi-field data structure 208 is reserved for the reader A 204. As noted above, the reader A 204 is storing the owner identification of the current element (the first element) in the reservation field X 208 (see 406 above). This read access is still needed for the current element because the owner identification of the next element is being determined from the next pointer of the current element. Therefore, the read access module 125 stores the owner identification of the next element in the other field of the multi-field data structure 205 (the reservation field Y 210). Once the read access module 125 traverses to the element beyond the next element, the reservation field Y 208 is released and considered unused. Accordingly, the read access module 125 can store a subsequent owner identification of an element therein. Therefore, as described herein more than one reservation field is needed in the multi-level data structure. Operations of the flowchart 400 continue.

The read access module 125 rereads the next pointer stored in the current of the linked list (406). With reference to FIG. 2, the read access module 125 again reads the field from the next pointer 225, after storage of the identification of the next element in the multi-field data structure (see 404). This rereading of the field ensures that the address of the next pointer has not changed to an address of a different element while the identification of the next element is being stored. Operations of the flowchart 400 continue.

The read access module 125 determines whether the owner identification of the next element stored in the multi-field data structure is equal to the owner identification of the element whose address was reread after storage (408). With reference to FIG. 2 and returning to the example where the read access module 125 is the reader A 204, the reader A 204 determines whether the owner identification stored in the reservation field Y 210 is equal to the owner identification of the element B 226. If the owner identifications are not equal, operations continue at 409. In such a situation, the linked list has changed since the owner identification of the first element has been stored in the multi-field data structure. In particular, the next pointer of the current element of the linked list is now pointing to a different element. For example, a writer may have added an element between the element A 224 and the element B 226. Alternatively or in addition, a writer may have deleted the element B 226). If the identifications are equal, operations of the flow chart 400 continue at 410.

The read access module 125 frees the reservation in the field in the multi-field data structure that stored the owner identification of the next element (409). In particular, the read access module 125 frees the reservation made at 404 because the stored identification did not equal the reread identification. Operations of the flowchart 400 return to 402.

The read access module 125 advances in the linked list such that the next element is the current element (410). With reference to FIG. 2, the read access module 125 advances in the linked list 221 such that the current element being processed is the element B 226. Also once the read access module 125 advances, the reservation field of the multi-field data structure that was storing the identification of the prior element can be cleared and considered unused for subsequent operations (as described above). In this example, the reservation field X 208 can be cleared. Operations of the flowchart 400 continue.

The read access module 125 reads the data from the current element (412). With reference to FIG. 2, the read access module 125 reads the contents stored in the element B 226. Operations of the flow chart 400 continue.

The read access module 125 determines whether the end of the linked list has been reached. The read access module 125 can make this determination based on the address stored in the next pointer of the current element. The address of the end of the linked list can be a known value that can be provided when traversal initially begins (similar to the read access module 125 being provided the address of the header of the linked list 221 as part of the command to traverse the linked list 221— see 402 above). Therefore, if the address stored in the next pointer of the current element equals the address of the end of the linked list 221, the end of the linked list 221 has been reached. If reached, the operations of the flowchart 400 are complete. Otherwise, operations of the flowchart 400 continue 402.

Figure 5:
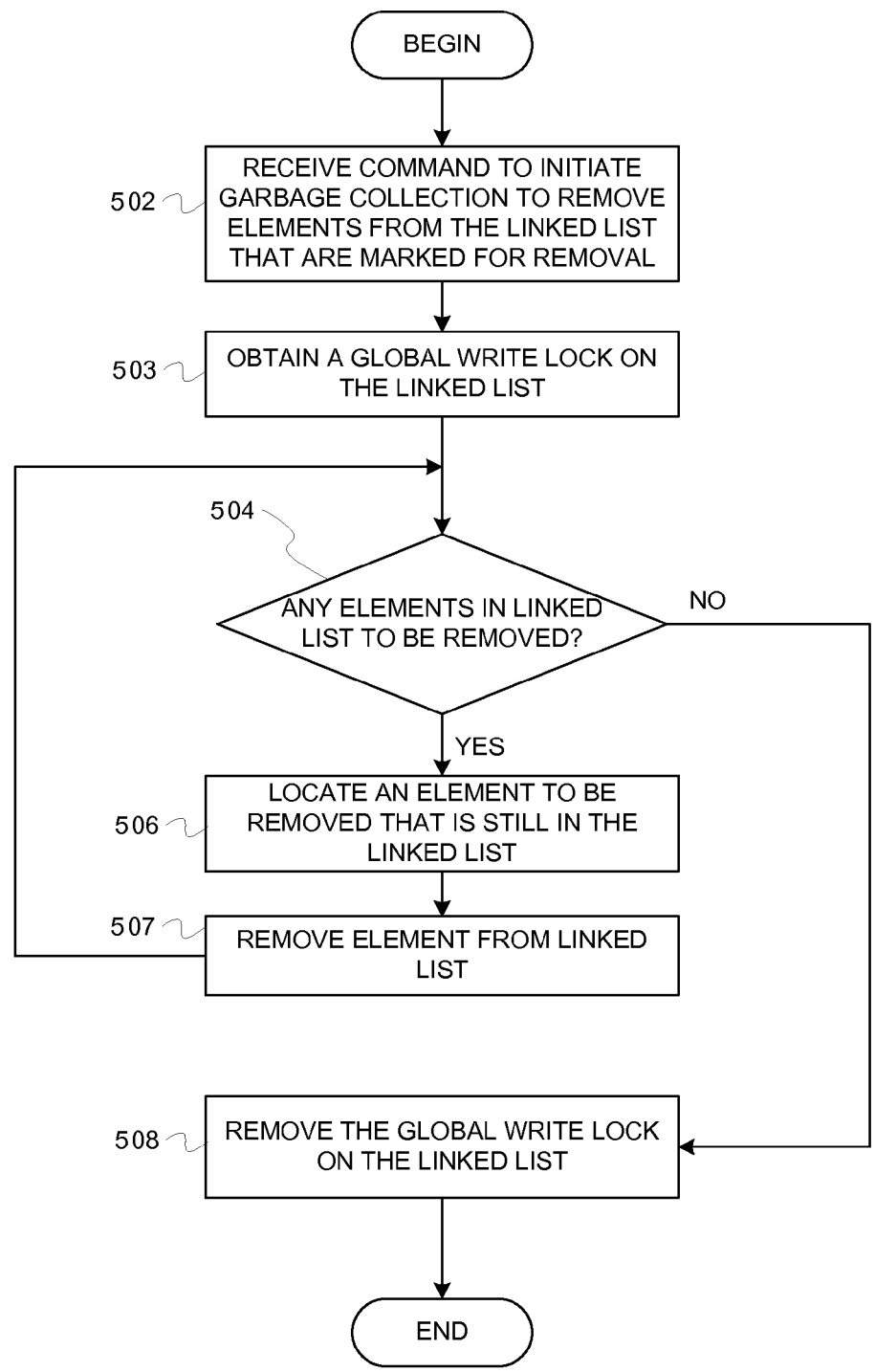
FIGS. 5-6 are flowcharts of operations for garbage collection of elements in a linked list, according to some example embodiments.

FIGS. 5-6 are flowcharts of operations for garbage collection of elements in a linked list, according to some example embodiments. In particular, FIG. 5 is a flowchart of operations to remove one or more elements from the linked list. FIG. 6 is a flowchart of operations to free the elements that have been removed from the linked list. FIGS. 5-6 are described as being performed by the garbage collection module 123 of FIG. 1. In some example embodiments, the operations of FIG. 5 and the operations of FIG. 6 are performed independent of each other. For example, the operations of FIG. 5 can remove one or more elements from the linked list. Subsequently, the operations of FIG. 6 can free these elements that have been removed from the linked list. A flowchart 500 is described with reference to FIGS. 1-2.

The garbage collection module 123 receives a command to initiate garbage collection to remove elements from a linked list that are marked for removal (502). This command can be from any application or process that requests that the garbage collection module 123 perform this operation. Alternatively or in addition, garbage collection can be performed periodically at predefined times. This command can also designate which elements are to be removed from the linked list. Operations of the flowchart 500 continue.

The garbage collection module 123 obtains a global write-lock on the linked list (503). The garbage collection module 123 determines whether another module has a write-lock on the linked list. If so, the garbage collection module 123 is required to wait until the write-lock is available. Operations of the flowchart 500 continue.

The garbage collection module 123 determines whether there are any elements that are still in the linked list that need to be removed (504). As noted above, the elements to be removed can be included as part of the command to perform garbage collection. Alternatively or in addition, the list of elements to be deleted can be provided by a different process, stored in a separate data structure accessible by the garbage collection module 123, etc. If there are no elements still in the linked list to be removed, the operations of the flowchart 500 continue at 508 (described below). Otherwise, operations of the flowchart 500 continue at 506.

The garbage collection module 123 locates an element that is still in the linked list (506). For example, the garbage collection module 123 can start at the beginning of the linked list 221 to locate a first of the elements marked for deletion (deleteable elements). Operations of the flowchart 500 continue.

The garbage collection module 123 removes the element from the linked list (507). In some example embodiment as part of the removal, the garbage collection module 123 updates the next pointer of any element pointing to the element to be deleted (510). In some example embodiments, the update of a given next pointer can be performed in a single store that completes atomically. As described above in reference to FIG. 2, the next pointer of any element pointing to the deleted element is changed to point to where the next pointer of the deleted element is pointing—the subsequent element in the linked list 221. Also with reference to FIG. 2, the garbage collection module 123 moves the removed element from the first list to the second list. Accordingly, the garbage collection module 123 moves the removed element to the end of the second list.

In some situations, an element removed from the linked list but not yet freed can point to another element being removed. For example, assume that element B is removed from the linked list into the second list (removed but not yet freed). In this situation, element A now points to element C. However, element B is still pointing to element C. Assume that element C is then to be removed from the linked list. In certain situations, the garbage collection would remove and free element C, while a reader is still using element B. Accordingly, the next pointer for B (that is pointing to element C) would be invalid. To avoid this situation, if any removed element that is not yet freed points to another element being removed, the next pointer of this removed element not yet freed is updated.

With reference to the example above, the value of the next pointer for element C is copied to the next pointer for element B before element C is removed from the linked list. Accordingly, the garbage collection module 123 makes this determination and possible update to the next pointers as part of the removal of the element from the linked list. Operations of the flowchart 500 continue back at 504, where the determination is again made of whether there are any elements in the linked list to still be removed.

The garbage collection module 123 removes the global write lock on the linked list (508). In particular, all the elements marked for removal have been removed from the linked list.

The operations of the flowchart 600 are now described. In particular, the operations to free elements that have been removed from the linked list.

The garbage collection module 123 receives a command to initiate garbage collection to free elements from a linked list that have been removed from the linked list (602). This command can be from any application or process that requests that the garbage collection module 123 perform this operation. Alternatively or in addition, garbage collection can be performed periodically at predefined times. Operations of the flowchart 600 continue.

The garbage collection module 123 obtains a global write-lock on the linked list (604). The garbage collection module 123 determines whether another module has a write-lock on the linked list. If so, the garbage collection module 123 is required to wait until the write-lock is available. Operations of the flowchart 600 continue.

The garbage collection module 123 determines whether there are any removed elements that are still in the linked list that need to be freed (605). With reference to FIG. 2, the garbage collection module 123 can walk through the second list of removed elements of the linked list 221 starting at the header and locate a first element in this second list. If there are no elements in this second list, the operations of the flowchart 600 continue at 610 (described below). Otherwise, operations of the flowchart 600 continue at 606.

The garbage collection module 123 determines whether any fields in the multi-field data structures for the readers of the linked list have the identification of the removed element (606). For each reader currently performing a read access, the garbage collection module 123 traverses their associated multi-field data structure. With reference to FIG. 2, the writer 202 is representative of the garbage collection module 123. Also, there are two readers of the linked list 221—the reader A 204 and the reader N 206. In this example, the writer 202 reads each of the reservations fields of the multi-field data structure 205 and the multi-field data structure 207—the reservation field X 208, the reservation field Y 210, the reservation field 212, and the reservation field 214. The writer 202 determines whether any of these reservation fields store the identification of the removed element being freed. If any of the fields of the multi-field data structures store the identification of this element, the removed element is currently being read accessed by a reader of the linked list (as described above). Accordingly, the garbage collection module 123 cannot free the removed element from the linked list 221. Therefore, if the garbage collection module 123 determines that at least one of the fields in the multi-field data structures for the readers of the linked list have the identification of the removed element, the operations of the flowchart 600 continue at 608 where the next element in the second list of removed elements is checked. If the next element is the end of the list, the determination at 605 causes operations to continue at 610. If the garbage collection module 123 determines that no fields in the multi-filed data structures for the readers of the linked list have the identification of the removed element, operations of the flowchart 600 continue at 608.

The garbage collection module 123 performs garbage collection of the deleted element (608). In particular because no reader is accessing the removed element, the garbage collection module 123 can perform the garbage collection. In some example embodiments, the garbage collection can comprise adding the memory associated with the removed element back to the heap, deallocating the memory, etc. Operations of the flowchart 600 continue at 605, where the garbage collection module 123 traverses to the next element in the second list of removed elements. If the next element is the end of the list, the determination at 605 causes operations to continue at 610.

As described above, in some example embodiments, the identification of the deleted element is an identification of the owner of the element. An owner of the element can be considered the application or process that created the element. In some situations, one owner can own multiple elements in the linked list. Accordingly, one scan of the fields of the multi-field data structures can identify all the deleted elements for a given owner (see 506 above). In some example embodiments, the operations at 507 can be performed for multiple elements owned by a same owner (using the identification of the owner during the scan). Accordingly, for these multiple elements owned by a same owner, the next pointer of the elements pointing to the elements can be updated and the elements removed from the linked list.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for optimizing design space efficiency as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    a first of a plurality of readers of a linked list performing an operation to attempt to read a first element of the linked list, the operation comprising,
        atomically reading, by at least one processor, a next field of a current element of the linked list to determine a first value, wherein the first value encodes a first pointer to the first element and a first indication of an owner of the first element;
        decoding the first value to determine the first pointer and the owner;
        storing the first indication of the owner in a first field of a first of a plurality of multi-field reservation data structures, wherein the first multi-field reservation data structure corresponds to the first reader, wherein a current indication of an owner of the current element is stored in a second field of the first multi-field reservation data structure;
        rereading the next field of the current element of the linked list;
        determining whether the next field of the current element in the linked list equals the first indication of the owner stored in the first field of the first multi-field reservation data structure;
        reading the first element of the linked list via the first pointer if the next field of the current element that was reread from the linked list equals the first indication of the owner stored in the first field of the first multi-field reservation data structure; and
        if the next field of the current element that was reread from linked list does not equal the first indication of the owner stored in the first field of the first multi-field reservation data structure,
            removing the first indication of the owner from the first multi-field reservation data structure; and
            repeating said atomically reading, decoding, storing and determining again for the next field of the current element.

2. The method of claim 1, further comprising performing an operation associated with a kernel service responsive to reading the first element of the linked list via the first pointer, wherein the first reader accesses the linked list responsive to a system call to the kernel service.

3. The method of claim 2, wherein the operation comprises one of logging, authenticating, and performing a security measure.

4. The method of claim 1, wherein the first of the plurality of readers of the linked list performs a different atomic operation to attempt to read a second element of the linked list, the different atomic operation comprising reading a second element after successfully reading the first element to reflect the release of the reservation on the first element after reserving the second element.

5. The method of claim 1, further comprising receiving a command to perform garbage collection for removal of a deleted element from elements in the linked list, wherein responsive to the command to perform garbage collection,
    obtaining the write-lock on the linked list for the garbage collection, responsive to determining that a write-lock is not on the linked list.

6. The method of claim 5, wherein responsive to obtaining the write-lock on the linked list,
    responsive to determining that an identification of an owner of the deleted element is not stored in the plurality of multi-field reservation data structures,
        reading and updating, in a single atomic operation, of a pointer of any elements pointing to the deleted element; and
    performing garbage collection of the deleted element.

7. An apparatus comprising:
    a non-transitory machine-readable medium configured to store elements in a linked list;
    a processor; and
    a reader executable on the processor, the reader configured to read the linked list, wherein the reader is configured to performing an operation to attempt to read a first element of the linked list, the operation configured to,
        atomically read a next field of a current element of the linked list to determine a first value, wherein the first value encodes a first pointer to the first element and a first indication of an owner of the first element;
        decode the first value to determine the first pointer and the owner;
        store the first indication of the owner in a first field of a first of a plurality of multi-field reservation data structures, wherein the first multi-field reservation data structure corresponds to the first reader, wherein a current indication of an owner of the current element is stored in a second field of the first multi-field reservation data structure;
        reread the next field of the current element of the linked list;
        determine whether the next field of the current element in the linked list equals the first indication of the owner stored in the first field of the first multi-field reservation data structure;
        read the first element of the linked list via the first pointer if the next field of the current element that was reread from the linked list equals the first indication of the owner stored in the first field of the first multi-field reservation data structure; and
        if the next field of the current element that was reread from linked list does not equal the first indication of the owner stored in the first field of the first multi-field reservation data structure,
            remove the first indication of the owner from the first multi-field reservation data structure; and
            repeat said atomically reading, decoding, storing and determining again for the next field of the current element.

8. The apparatus of claim 7, wherein determination of whether the next field of the current element still indicates the first value comprises a reread the next field to determine the current value and a comparison of the first value to the current value.

9. The apparatus of claim 7, further comprising a kernel service executable on the processor, wherein the kernel service is configured to perform an operation responsive to reading the first element of the linked list via the first pointer, wherein the reader is configured to access the linked list in response to a system call to the kernel service.

10. The apparatus of claim 9, wherein the operation comprises one of logging, authenticating, and performing a security measure.

11. The apparatus of claim 7, wherein the reader is configured to perform a different atomic operation to attempt to read a second element of the linked list, the different atomic operation comprising a read a second element after successfully read of the first element to reflect the release of the reservation on the first element after reservation of the second element.

12. A computer program product for processing a linked list, the computer program product comprising:

a computer readable storage medium having computer readable program code embodied therewith, the computer readable program code comprising reader code, the reader code configured to perform an operation to attempt to read a first element of the linked list, wherein the operation is configured to, atomically read a next field of a current element of the linked list to determine a first value, wherein the first value encodes a first pointer to the first element and a first indication of an owner of the first element;

decode the first value to determine the first pointer and the owner;

store the first indication of the owner in a first field of a first of a plurality of multi-field reservation data structures, wherein the first multi-field reservation data structure corresponds to the first reader, wherein a current indication of an owner of the current element is stored in a second field of the first multi-field reservation data structure;

reread the next field of the current element of the linked list;

determine whether the next field of the current element in the linked list equals the first indication of the owner stored in the first field of the first multi-field reservation data structure;

read the first element of the linked list via the first pointer if the next field of the current element that was reread from the linked list equals the first indication of the owner stored in the first field of the first multi-field reservation data structure; and if the next field of the current element that was reread from linked list does not equal the first indication of the owner stored in the first field of the first multi-field reservation data structure, remove the first indication of the owner from the first multi-field reservation data structure; and repeat said atomically reading, decoding, storing and determining again for the next field of the current element.

13. The computer program product of claim 12, wherein determination of whether the next field of the current element still indicates the first value comprises a reread the next field to determine the current value and a comparison of the first value to the current value.

14. The computer program product of claim 12, wherein the computer readable program code further comprises a kernel service code configured to perform an operation responsive to reading the first element of the linked list via the first pointer, wherein the reader code is configured to access the linked list in response to a system call to the kernel service code.

15. The computer program product of claim 12, wherein the computer readable program code further comprises a garbage collection code configured to receiving a command to perform garbage collection for removal of a deleted element from elements in the linked list, wherein responsive to the command to perform garbage collection, the garbage collection code is configured to obtain the write-lock on the linked list for the garbage collection, in response to a determination that a write-lock is not on the linked list; and responsive to obtaining the write-lock on the linked list and responsive to determining that an identification of an owner of the deleted element is not stored in the plurality of multi-field reservation data structures, update, in a single atomic operation, of a pointer of any elements pointing to the deleted element; and perform the garbage collection of the deleted element.

* * * * *